United States Patent
Ma et al.

(10) Patent No.: US 6,436,180 B1
(45) Date of Patent: Aug. 20, 2002

(54) COLOR INK COMPOSITION FOR GRAPHIC ART INK JET IMAGE PRINTERS

(75) Inventors: Zeying Ma; Rodney D. Stramel; Shunqiong Yue; Kai-Kong Iu; Hsin-Chieh Chou, all of San Diego; Duane G. Canfield, Escondido, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/540,102

(22) Filed: Mar. 31, 2000

(51) Int. Cl.$^7$ ............................................... C09D 11/02
(52) U.S. Cl. ............................... 106/31.59; 106/31.89; 106/31.58; 106/31.86; 106/31.75; 106/31.43
(58) Field of Search .......................... 106/31.89, 31.86, 106/31.77, 31.75, 31.58, 31.59, 31.47, 31.43

(56) References Cited

U.S. PATENT DOCUMENTS

| | | | |
|---|---|---|---|
| 4,963,189 A | 10/1990 | Hindagolla | 106/31.52 |
| 5,085,698 A | 2/1992 | Ma et al. | 106/20 |
| 5,221,334 A | 6/1993 | Ma et al. | 106/20 D |
| 5,302,197 A | 4/1994 | Wickramanayke et al. | 106/22 H |
| 5,725,641 A | 3/1998 | MacLeod | 106/31.5 |
| 5,788,750 A | 8/1998 | Gundlach et al. | 106/31.27 |
| 5,788,754 A | 8/1998 | Deardurff et al. | 106/31.58 |
| 5,851,273 A | 12/1998 | Morris et al. | 106/31.27 |
| 5,855,656 A | 1/1999 | Gundlach et al. | 106/31.43 |
| 5,858,075 A | 1/1999 | Deardurff et al. | 106/31.27 |

FOREIGN PATENT DOCUMENTS

| | | |
|---|---|---|
| EP | 0404494 | 6/1990 |
| EP | 0882770 | 12/1998 |

*Primary Examiner*—Helene Klemanski
*Assistant Examiner*—Veronica F. Faison

(57) ABSTRACT

An ink jet ink composition is provided for large format printers for printing on both porous, non-porous, and hybrid glossy media. The ink composition comprises at least one water-soluble dye and a vehicle comprising at least one co-solvent and at least two different surfactants, a non-ionic surfactant and a fluoro-surfactant. The total surfactant concentration ranges from about 0.1 to 5 wt % of the ink composition. The non-ionic surfactant is present in a range of about 0.05 to 3 wt % of the ink composition, while the fluoro-surfactant is present in a range of about 0.001 to 3 wt % of the ink composition. The ink formulation that works well with porous, non-porous, and hybrid glossy media and provides substantially instant ink drying and light fastness of the ink. Further, the ink formulation evidences excellent image quality. The ink can also pass harsh pen material compatibility tests. The ink does not puddle on the surface of the orifice plate in the default pen, yet has low viscosity. The ink is excellent in pen reliability such as long decap time, no decel, no kogation, and good drop directionality.

21 Claims, No Drawings

COLOR INK COMPOSITION FOR GRAPHIC ART INK JET IMAGE PRINTERS

TECHNICAL FIELD

The present invention is directed generally to large format image printers and, more particularly, to color ink jet ink compositions for such printers.

BACKGROUND ART

A large format printer of high throughput requires, among other things, fastdrying glossy media. By "large format" is typically meant graphic art, including photographic prints, printed on media widths ranging from 36 to 60 inches. In some printers, the media width may be varied, while in others, it may be fixed. Examples of such large format printers include Hewlett-Packard's DesignJet series (2000, 2500CP, 2800, 3500CP, 3800, 5000, 5000PS); an example of a glossy media printer includes Hewlett-Packard's Photosmart Printer. The 2K series can print on media widths of 35 inches, the 3K series can print on media widths of 54 inches, and the 5K series can print on media widths of 42 and 60 inches. The Photosmart Printer is not a large format printer, but is a graphic art printer. In any event, the afore-mentioned printers print on glossy media, among others.

While glossy media evidencing fast ink drying are required, such media are porous and poor in light-fastness. To meet the broad range of customer needs, a slowdrying, non-porous media of good light-fastness is also necessary.

A number of inks have been previously disclosed and claimed; see, e.g., U.S. Pat. No. 5,851,273, entitled "Dye Set for Improved Ink-Jet Print Quality", issued on Dec. 22, 1998, to Peter C. Morris et al; U.S. Pat. No. 5,788,754, entitled "Ink-Jet Inks for Improved Image Quality", issued on Aug. 4, 1998, to Larrie A. Deardurff et al; and U.S. Pat. No. 5,858,075, entitled "Dye-Set for Improved Ink-Jet Image Quality", issued on Jan. 12, 1999, to Larrie A. Deardurff et al, all assigned to the same assignee as the present application. The inks of the first patent are employed in the DesignJet printer, while the inks of the last two patents are employed in the Photosmart Printer.

The inks disclosed and claimed in the foregoing patents provide excellent image quality on non-porous glossy such as Hewlett-Packard's High Gloss Photopaper C6026A. However, these inks do not perform as well with porous glossy media, nor on hybrid glossy media (a combination of porous and non-porous), such as Hewlett-Packard's Photopaper C6959. Hybrid glossy media exhibit short dry times and good light fastness.

On the other hand, other Hewlett-Packard inks that are good for porous glossy media do not print as well on the non-porous glossy media.

Other issues constantly associated with the ink for imaging are pen material compatibility and puddling. Because aggressive surfactants are needed for better image quality, the ink often causes delamination or detachment of pen headland area. To reduce coalescence on glossy media, a high penetration rate of the ink into the print medium is desired; such a high penetration requires a low viscosity ink. However, low viscosity inks tend to puddle on the pen, specifically, on the pen's orifice plate, through which the ink is ejected onto the print medium. Such puddling on the printhead surface is a big concern for ink jet printing. Problems caused by puddling include drop misdirectionality, massive ink accumulation on the nozzle (orifice) plate, pen service difficulties, and increased ink contact/attack to the cover layer of flex circuit from outside in. The flex circuit provides electrical signals to resistor pads associated with nozzles in the nozzle plate to generate ink bubbles, which are expelled toward the print medium.

Typically, ink flow channel design and firing chamber architecture are designed to modulate puddling. Damped architecture can control puddling by the reduction of ink refill speed. However, that may add a negative effect on firing frequency response. Damped architecture is also more susceptible to starvation and camber angle variation from nozzle to nozzle. In addition, damped architecture could add more difficulties for pen manufacturing.

Another approach is to increase the viscosity of ink. This could be realized by adding a high molecular weight surfactant/oligomer/polymer. Using viscous cosolvent or increasing the total organic content can also raise ink viscosity. However, image quality, defined by ink/media interaction, will not be optimized due to the formulation restriction for puddling control.

Thus, an ink composition is required that eliminates, or at least minimizes, the foregoing problems, while providing improved image quality print on porous, non-porous, and hybrid porous glossy media, consistent with high throughput.

DISCLOSURE OF INVENTION

In accordance with the present invention, an ink jet ink composition is provided for large format printers for printing on porous, non-porous, and hybrid glossy media. The ink composition comprises at least one water-soluble dye and a vehicle comprising at least one co-solvent and at least two different surfactants, a non-ionic surfactant and a fluoro-surfactant.

The total surfactant concentration ranges from about 0.1 to 5 wt % of the ink composition. The non-ionic surfactant is present in a range of about 0.05 to 3 wt % of the ink composition, while the fluoro-surfactant is present in a range of about 0.001 to 3 wt % of the ink composition.

The present invention provides an ink formulation that works well with porous, non-porous, and hybrid glossy media. A printer, such as the DesignJet 5000PS that accommodates the hybrid glossy media will provide the customer with substantially fast ink drying while maintaining the light fastness of the ink, compared to prior art inks.

The ink of the present invention evidences excellent image quality. The ink can also pass harsh pen material compatibility tests. The ink does not puddle on the surface of the orifice plate in the default pen, yet has low viscosity (less than 2 cp). The ink is excellent in pen reliability such as long decap time (greater than 30 sec), no decel, no kogation, and good drop directionality. The term "decap time" refers to the time required for ink to crust in the nozzles of the pen; a long decap time is desired. By "decel" is meant that the velocity of ink drops decreases with time during continuous firing of the pen, and is an undesirable property.

BEST MODES FOR CARRYING OUT THE INVENTION

The invention described herein is directed to improved inks for printing ink-jet images using commercially-available ink-jet printers such as the DeskJet® family of printers, manufactured by Hewlett-Packard Company, Palo Alto, Calif. The inks of the present invention can produce true colors on a variety of glossy media, whether porous, non-porous, or hybrid, with high throughput and high light fastness.

The inks of the present invention include yellow, cyan, and magenta inks containing a yellow dye, a cyan dye, and one or two magenta dyes, respectively. In particular, the yellow dye is Direct Yellow 132, the cyan dye is Direct Blue 199, and the magenta dye is Magenta 377 (Ilford AG, Switzerland), alone or together with Acid Red 52. These dyes are all anionic dyes and are associated with a sodium counterion.

The present yellow, cyan, and magenta aqueous ink compositions each comprise in general from about 0.1 to 10 wt % of the dye (or dyes) and a vehicle comprising the following components (in wt % of the total ink composition): about 3 to 40 wt %, preferably about 5 to 20 wt %, and most preferably about 13 to 15 wt % of at least one water-miscible organic co-solvent; about 0.1 to 5 wt % of a surfactant mixture comprising at least one non-ionic surfactant and at least one fluoro-surfactant; 0 to about 1.5 wt % of at least one component independently selected from the group consisting of buffers, biocides, and metal chelators; and the balance water. In an alternate embodiment, the surfactant mixture comprises at least three surfactants: the non-ionic surfactant, an anionic surfactant, and the fluoro-surfactant, which may be non-ionic or anionic.

In the practice of the present invention, each ink color, namely, cyan, yellow, and magenta, can comprise more than one dye load. That is, there can be one or more ink-jet pens filled for each ink color, each pen having a different dye load or a different dye. For example, there can be two cyan pens, each one containing a different dye load and/or a different cyan dye.

All concentrations herein are in weight percent of the total ink composition, unless otherwise indicated. The purity of all components is that employed in normal commercial practice for ink-jet inks.

The yellow dye is Direct Yellow 132 (DY132), present in an amount of about 1 to 5 wt %, preferably about 2.5 to 3.5 wt %. In setting the concentration of the yellow dye, it is preferred that the ink has an absorbance (A) of 0.119 at the lambda maximum of 400 nm for a 1:10,000 dilution.

The cyan ink is Direct Blue 199 (DB 1 99), present in an amount of about 0. 1 to 5 wt %, preferably about 2.5 to 3.5 wt %. In setting the concentration of the cyan dye, it is preferred that the ink has an absorbance (A) of 0.10 at the lambda maximum of 620 nm for a 1: 10,000 dilution.

The magenta ink is a mixture of Magenta 377 (M377) (Ilford AG, Switzerland) and Acid Red 52 (AR52) and is present in a total amount of about 0.1 to 5 wt %, preferably about 2.5 to 3.5 wt %. In setting the concentration of the magenta dye, it is preferred that the ink has an absorbance (A) of 0.079 at the lambda maximum of 520 nm for a 1:10,000 dilution of the M337 dye and an absorbance (A) of 0.038 at the lambda maximum of 566 nm for a 1:10,000 dilution of the AR52 dye.

The black ink suitably employed in the practice of the present invention can be dye-based or pigment-based. The black ink can also be a composite of the three primary colors, yellow, cyan, and magenta. Suitable dye-based black inks are disclosed and claimed, for example, in U.S. Pat. No. 4,963,189, entitled "Waterfast Ink Formulations with a Novel Series of Anionic Dyes Containing Two or More Carboxyl Groups", issued on Oct. 16, 1990, to Suraj L. Hindagolla, and U.S. Pat. No. 5,725,641, entitled "Lightfast Inks for Ink-Jet Printing", issued on Mar. 10, 1998, to Cheryl A. MacLeod, both assigned to the same assignee as the present application. Suitable black pigment-based inks are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks", all assigned to E.I. DuPont de Nemours and Company. The preferred black dye is Pacified Reactive Black 31, available from Avecia Co. This ink, which is dye-based, has an absorbance (A) of 0.12 at the lambda maximum of 570 nm for a 1:10,000 dilution.

A As indicated above, the inks of the present invention comprise about 5 to 20 wt % water-miscible organic co-solvent. More preferably, the inks comprise about 8 to 15 wt % organic co-solvent.

The water-miscible organic co-solvents suitably employed in the practice of the present invention include any of, or a mixture of two or more of, such compounds as nitrogen-containing ketones, such as 2-pyrrolidone, N-methyl-pyrrolid-2-one (NMP), 1,3-dimethylimidazolid-2-one, and octyl-pyrrolidone; diols such as ethanediols (e.g., 1,2-ethanediol), propanediols (e.g., 1,2-propanediol, 1,3-propanediol, 2-ethyl-2-hydroxymethyl-1,3-propanediol, ethylhydroxy-propanediol (EHPD)), butane-diols (e.g., 1,2-butanediol, 1,3-butanediol, 1,4-butanediol), pentanediols (e.g., 1,2-pentanediol, 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octanediol); alcohols, such as $C_3$–$C_6$ alcohols (e.g., propanol, butanol, pentanol, and hexanol), including isomers thereof (e.g., 1-propanol and 2-propanol); glycol ethers and thioglycol ethers commonly employed in ink-jet inks, such as polyalkylene glycols such as polyethylene glycols (e.g., diethylene glycol (DEG), triethylene glycol, tetraethylene glycol), propylene glycols (e.g., dipropylene glycol, tripropylene glycol, tetrapropylene glycol), polymeric glycols (e.g., PEG 200, PEG 300, PEG 400, PPG 400), and thiodiglycol. Additional co-solvents include hydantoins (glycol ureas) and derivatives thereof, such as a hydantoin containing ethyl hydroxide and methyl groups, available from Lonza, Inc. as Dantocol DHE, and polyalkoxylated triols, such as Multranol 4012, which is a polyalkoxylated triol having a molecular weight of about 440, available from Bayer.

Preferably, the organic co-solvent comprises a mixture of 2-pyrrolidone and 1,6-hexanediol.

The inks of the present invention further comprise a mixture of two surfactants, the total surfactant concentration ranging from about 0.1 to 5 wt %. The surfactant mixture comprises a non-ionic surfactant and a fluoro-surfactant. Alternatively, the surfactant mixture comprises a non-ionic surfactant, an anionic surfactant, and either a non-ionic or an anionic fluoro-surfactant.

The concentration of the non-ionic surfactant is in the range of about 0.5 to 3 wt % of the ink composition. One example of a suitable non-ionic surfactant includes the SURFYNOL series, which are acetylenic ethoxylated diols available from Air Products. Another example of a suitable non-ionic surfactant includes the TERGITOL series, which are polyethylene or polypropylene oxide ethers available from Union Carbide.

The concentration of the optional anionic surfactant is in the range of about 0.05 to 3 wt % of the ink composition. One example of a suitable anionic surfactant includes sulfonates, such as the DOWFAX series, which are diphenyl sulfonate derivatives available from Dow Chemical.

Another example of a suitable anionic surfactant is the TO series, which are dioctyl sodium sulfosuccinates available from Cytec Ind.

Examples of suitable fluoro-surfactants include the ZONYL series, available from E.I. Du Pont de Nemours Company, and the FLUORAD series, available from 3M Company. The ZONYL fluoro-surfactants include $(R_F CH_2 CH_2 O)_x PO(O^{-NH_4^+})_y$, where $x+y=3$ and $R_F$ (FSP), FSP+hydrocarbon surfactant (FSJ), $R_F CH_2 CH_2 SO_3 H$, $R_F CH_2 CH_2 SO_3-NH_4+$ (TBS), $C_6 F_{13} CH_2 CH_2 SO_3 H$, $C_6 F_{13} CH_2 CH_2 SO_3^- NH_4^+$ (FS-62), $R_F CH_2 CH_2 SCH_2 CH_2 COO^- Li^+$ (FSA), $R_F CH_2 CH_2 O(CH_2 CH_2 O)_x H$ (FSO), and $R_F CH_2 CH_2 O(CH_2 CH_2 O)_x H$ (FSN). The moiety $R_F$ is $F(CF_2 CF_2)_z$, where $z=1-7$ (FSP, FSJ, FSO) or 1–9 (TBS, FSA). The FLUORAD fluoro-surfactants include ammonium perfluoroalkyl sulfonates (FC-120), potassium fluorinated alkyl carboxylates (FC-129), fluorinated alkyl polyoxyethylene ethanols (FC-170C), fluorinated alkyl alkoxylate (FC-171), and fluorinated alkyl ethers (FC-430, FC-431, FC-740).

Preferred fluoro-surfactants include ZONYL FSA, ZONYL FS-62, and FLUORAD FC-129.

The concentration of the fluoro-surfactant ranges from about 0.001 to 3 wt %, preferably from about 0.01 to 1 wt %, and most preferably from about 0.1 to 0.25 wt %. At a concentration less than about 0.001 wt %, the benefits afforded by the presence of the fluoro-surfactant are not realized, while a concentration greater than about 3 wt % is not soluble in the ink.

The anionic and non-ionic surfactants, in combination with the co-solvent(s), serve to reduce dry time and increase media throughput and are compatible with the glossy media, whether porous, non-porous, or hybrid. The fluoro-surfactant reduces puddling of the ink-jet ink on the nozzle plate. As a result, the pen orifice plate is cleaner. Better drop directionality and better serviceability are obtained. Because of less ink build-up on the print head, cross-contamination between colors is reduced.

As an example, an ink formulation containing 0.2 wt % FLUORAD FS-62 can control puddling and allow the ink to have a low viscosity (1.5 to 2.0 cps). Normally, for puddling benefit, an ink viscosity of above 3.0 is preferred.

The low viscosity ink provides fast penetration rate on glossy media. As a result, coalescence is minimized and image quality is improved. The fast penetrating ink is more media independent and works well for more than one glossy media. The fluoro-surfactant also provides excellent bleed control and reduced coalescence.

Due to the effectiveness of the fluoro-surfactant on puddling control, ink formulation freedom is expanded. Surfactants or solvents that are poor in puddling performance can be reconsidered and, indeed, can be used in combination with the fluoro-surfactant.

EXAMPLES

Example 1

An example of an ink-jet ink composition in accordance with the present invention is listed in Table I below. Table I lists the compositions for the color inks, yellow, cyan, and magenta, and for the color inks having reduced dye load, light cyan (20%) and light magenta (20%). The black ink employed contained Pacified Reactive Black 31, which had an absorbance (A) of 0.12 at 1:10,000 dilution.

TABLE I

| Component/Color | Ink Formulation | | | | |
|---|---|---|---|---|---|
| | Cyan | Magenta | Yellow | Light C | Light M |
| EDTA, Na salt | 0.1 wt % | 0.1 wt % | 0.1 wt % | 0.1 wt % | 0.1 wt % |
| Proxel GXL | 0.15 wt % | 0.15 wt % | 0.15 wt % | 0.15 wt % | 0.15 wt % |
| FLUORAD FS-62 | 0.18 wt % | 0.18 wt % | 0.18 wt % | 0.8 wt % | 0.18 wt % |
| DOWFAX 2A1 | 0.32 wt % | 0.32 wt % | 0.32 wt % | 0.32 wt % | 0.32 wt % |
| SURFYNOL CT-111 | 0.16 wt % | 0.16 wt % | 0.16 wt % | 0.16 wt % | 0.16 wt % |
| 1,6-hexanediol | 9 wt % | 9 wt % | 9 wt % | 9 wt % | 9 wt % |
| 2-pyrrolidone | 4 wt % | 4 wt % | 4 wt % | 4 wt % | 4 wt % |
| Na-DB199 @ 1/10K | A = 0.10 | | | 20% of C | |
| Na-M377 @ 1/10K | | A = 0.079 | | | 20% of M |
| Na-AR52 @ 1/10K | | A = 0.038 | | | 20% of M |
| Na-DY132 @ 1/10K | | | A = 0.119 | | |
| DDI Water | Balance | Balance | Balance | Balance | Balance |
| Total | 100 wt % | 100 wt % | 100 wt % | 100 wt % | 100 wt % |

Notes:
EDTA is ethylene diamine tetraacetate.
DDI water is distilled deionized water.
pH adjusted with KOH for the vehicle to 7.2 to 7.3.
pH adjusted with KOH or $HNO_3$ for final ink to 7.5 to 7.6.
Proxel GXL is a biocide.
Absorbance (A) spectra were measured on a Hewlett-Packard 8453 spectrophotometer at 1:10,000 dilution ("1/10K").

The printed inks of Table I evidenced no haze, compared to the inks of the prior art, which evidenced haze.

The dry time and smudge were measured and the results are listed in Table II below. Smudge was measured by running a thumb across the printed area at some time after printing to determnine whether or not the printed image was transferred or damaged.

TABLE II

Dry Time and Smudge Measurements.

|  | Present Invention | | Prior Inks | |
|---|---|---|---|---|
|  | Dry Time | Smudge | Dry Time | Smudge |
| porous | instant | no | | |
| hybrid | <2 min. | no | ca. 20 min. | 2 hrs. |
| non-porous | <12 min. | no | 20 min. | no |

Note:
The "prior ink" is one substantially equivalent to that disclosed and claimed in U.S. Pat. 5,851,273.

Example 2

An example of an ink-jet ink composition in accordance with the present invention is listed in Table III below. Table III lists the compositions for the color inks, yellow, cyan, and magenta, and for the color inks having reduced dye load, light cyan (30%) and light magenta (30%). The black ink employed contained Pacified Reactive Black 31, which had an absorbance (A) of 0.12 at 1:10,000 dilution.

The foregoing inks of Table III evidenced the same dry time and smudge results as in Table II above, compared to the prior art ink. Also, the printed inks of Table III evidenced no haze, compared to the inks of the prior art, which evidenced haze.

Coalescence of the printed ink on the media is an important consideration. Coalescence is the tendency of the ink to be distributed unevenly on the print media. This property is measured visually and assigned a value. A value of 1 is the best coalescence (i.e., relatively little coalescence), while a value of 5 is the worst coalescence (i.e., considerable coalescence), and is not acceptable.

Without the presence of the fluoro-surfactant, a coalescence of the printed ink of 5(as visually measured) was observed. With the fluoro-surfactant, the coalescence was determined to be 1.

Examples 3–10

A series of color inks were prepared, having essentially the same dye load, same EDTA, same Proxel, and same MOPS as in Example 2, except that the concentrations of ZONYL FS-62 (FS-62), TERGITOL 15-S-5 (15S5), TERGITOL 15-S-7 (15S7), propylene glycol mono-butyl ether (PNB), 1,6-hexanediol (HD), and 2-pyrrolidone (2-P) were varied. The compositional variances are shown in Table IV below.

TABLE III

Ink Formulation

| Component/Color | Cyan, wt % | Magenta, wt % | Yellow, wt % | Light C, wt % | Light M, wt % |
|---|---|---|---|---|---|
| EDTA, Na salt | 0.1 | 0.1 | 0.1 | 0.1 | 0.1 |
| Proxel GXL | 0.15 | 0.15 | 0.15 | 0.15 | 0.15 |
| MOPS | 0.05 | 0.05 | 0.05 | 0.05 | 0.05 |
| ZONYL FSA | 0.8 | 0.8 | 0.8 | 0.8 | 0.8 |
| DOWFAX 2A1 | 0.32 | 0.32 | 0.32 | 0.32 | 0.32 |
| SURFYNOL CT-111 | 0.16 | 0.16 | 0.16 | 0.16 | 0.16 |
| 1,6-hexanediol | 9 | 9 | 9 | 9 | 9 |
| 2-pyrrolidone | 4 | 4 | 4 | 4 | 4 |
| Na-DB199 @ 1/10K | A = 0.10 | | | 30% of C A = 0.03 | |
| Na-M377 @ 1/10K | | A = 0.079 | | | 30% of M A = 0.0237 |
| Na-AR52 @ 1/10K | | A = 0.038 | | | 30% of M A = 0.0114 |
| Na-DY132 @ 1/10K | | | A = 0.119 | | |
| DDI Water | Balance | Balance | Balance | Balance | Balance |
| Total | 100 wt % | 100 wt % | 100 wt % | 100 wt % | 100 wt % |

Notes:
EDTA is ethylene diamine tetraacetate.
MOPS is 4-morpholinepropanesulfonic acid.
DDI water is distilled deionized water.
pH adjusted with KOH for the vehicle to 7.1 to 7.2.
pH adjusted with KOH or $HNO_3$ for final ink to 7.5.
Proxel GXL is a biocide.
Absorbance (A) spectra were measured on a Hewlett-Packard 8453 spectrophotometer at 1:10,00 dilution ("1/10K").

TABLE IV

Variances in Surfactant and Co-Solvent (wt %) and Measured Results.

| Example | FS-62 | 15S7 | 15S5 | PNB | 1,6-HD | 2-P | Puddling | Coalescence, non-porous | Coalescence, porous | Bleed, non-porous | Bleed, porous |
|---------|-------|------|------|-----|--------|-----|----------|-------------------------|---------------------|-------------------|---------------|
| 3 | 0.2 | 0.25 | 0.25 | 0.5 | 3 | 6 | 3 | good | good | | |
| 4 | | 0.5 | 0.3 | 1 | 9 | 8 | 5 | bad | good | bleed | bleed |
| 5 | | 0.5 | 0.3 | | 4 | 4 | 5 | bad | bad | bleed | bleed |
| 6 | 0.2 | 0.5 | | | | 8 | 1 | bad | OK | | |
| 7 | 0.2 | 0.5 | 0.3 | 1 | | 8 | 2 | good | good | | |
| 8 | | 0.5 | | 1 | 9 | 4 | 5 | bad | OK | bleed | bleed |
| 9 | 0.2 | 0.5 | 0.3 | | 9 | 4 | 1 | OK-good | good | | |
| 11 | 0.2 | | | | 9 | 8 | 1 | good | good | | |

The foregoing inks listed in Table IV were printed and their properties measured on non-porous glossy media and porous glossy media. The pens were examined for puddling of ink on the orifice plate and for cleanliness. The print was examined for ink dot coalescence and bleed. All results are based on visual comparisons. Where a number is given, 1=best and 5=worst. The results also are listed in Table IV.

From the results listed in Table IV, it is clear that the fluoro-surfactant helps to reduce puddling.

INDUSTRIAL APPLICABILITY

The inks of the present invention are expected to find use in thermal ink-jet printers in combination with glossy print media.

What is claimed is:

1. An ink-jet ink for printing on porous, non-porous, and hybrid glossy print media, said ink-jet ink comprising at least one colorant and a vehicle comprising at least one water-miscible organic co-solvent and water, said ink-jet ink further comprising at least three surfactants, the total surfactant concentration ranging from about 0.1 to 5 wt %, a first surfactant consisting essentially of an anionic surfactant, a second surfactant consisting essentially of a non-ionic surfactant, and a third surfactant consisting essentially of a fluorosurfactant, for reducing dry-time, increasing printer/media throughput, and providing good image quality on said glossy print media, wherein said fluoro-surfactant is selected from the group consisting of $(R_FCH_2CH_2O)_xPO(O^-NH_4^+)_y$, where $R_F$ is $F(CF_2CF_2)_z$, where $z=1-7$ and where $x+y=3$; $(R_FCH_2CH_2O)_xPO(O^-NH_4^+)_y$, where $R_F$ is $F(CF_2CF_2)_z$, where $z=1-7$ and where $x+y=3+$hydrocarbon surfactant; $R_FCH_2CH_2SO_3H$, where $R_F$ is $F(CF_2CF_2)_z$, where $z=1-9$; $R_FCH_2CH_2SO_3$—$NH_4^+$, where $R_F$ is $F(CF_2CF_2)_z$, where $z=1-9$; $C_6F_{13}CH_2CH_2SO_3H$; $C_6F_{13}CH_2CH_2SO_3^-NH_4^+$; $R_FCH_2CH_2S$—$CH_2CH_2COO^-Li^+$, where $R_F$ is $F(CF_2CF_2)_z$, where $z=1-9$; $R_FCH_2CH_2O(CH_2CH_2O)_xH$, where $R_F$ is $F(CF_2CF_2)$, where $z=1-7$; $R_FCH_2CH_2O$—$(CH_2CH_2O)_yH$, where $R_F$ is $F(CF_2CF_2)_z$, where $z=1-9$; ammonium perfluoroalkyl sulfonates; potassium fluorinated alkyl carboxylates; fluorinated alkyl polyoxyethylene ethanols; fluorinated alkyl alkoxylate; and fluorinated alkyl ethers.

2. The ink-jet ink of claim 1 wherein said non-ionic surfactant has a concentration within a range of about 0.05 to 3 wt % of said ink and wherein said fluoro-surfactant has a concentration within a range of about 0.001 to 3 wt % of said ink.

3. The inkjet ink of claim 1 wherein said first surfactant has a concentration within a range of about 0.05 to 3 wt % of said ink.

4. The ink-jet ink of claim 1 wherein said first surfactant is a diphenyl sulfonate derivative, a sulfonate, or a dioctyl sodium sulfosuccinate, said second surfactant is an acetylenic ethoxylated diol or a polyethylene oxide ether or a polypropylene oxide ether, and said third surfactant is said fluoro-surfactant.

5. The ink-jet ink of claim 1 wherein said colorant is a water-soluble dye.

6. The ink-jet ink of claim 5 wherein said water-soluble dye comprises at least one dye selected from the group consisting of yellow, cyan, and magenta dyes.

7. The ink-jet ink of claim 6 wherein said yellow dye consists essentially of Direct Yellow 132, wherein said cyan dye consists essentially of Direct Blue 199, and wherein said magenta dye is selected from the group consisting of Magenta 377 and a mixture consisting essentially of Magenta 377 and Acid Red 52.

8. The ink-jet ink of claim 1 wherein said at least one water-miscible cosolvent is selected from the group consisting of nitrogen-containing ketones; diols selected from the group consisting of ethanediols, propanediols, butanediols, pentanediols, hexanediols, heptanediols, and octanediols; $C_3$–$C_6$ alcohols and isomers thereof; glycol ethers selected from the group consisting of polyalkylene glycols, and polymeric glycols; thioglycol ethers; glycol ureas; and polyalkoxylated triols.

9. The ink-jet ink of claim 8, wherein said at least one water-miscible organic co-solvent is selected from the group consisting of 2-pyrrolidone, N-methylpyrrolid-2-one (NMP), 1,3-dimethylimidazolid-2-one, octyl-pyrrolidone, 1,2-ethanediol, 1,2-propanediol, 1,3-propanediol, $^2$-ethyl-2-hydroxymethyl- 1,3-propanediol, ethylhydroxypropanediol, 1,2-butanediol, 1,3-butanediol, 1,4-butanediol, 1,2-pentanediol, 1,5-pentanediol, 1,2-hexanediol, 1,6-hexanediol, 2,5-hexanediol, 1,2-heptanediol, 1,7-heptanediol, 1,2-octanediol, 1,8-octanediol, propanol, butanol, pentanol, and hexanol, diethylene glycol, triethylene glycol, tetraethylene glycol, dipropylene glycol, tripropylene glycol, tetrapropylene 92 glycol, Polyethylene Glycol 200, Polyethylene Glycol 300, Polyethylene Glycol 400, Polypropylene Glycol 400, and thiodiglycol.

10. The ink-jet ink of claim 9 wherein said at least one water-miscible or-ganic co-solvent comprises a mixture of 2-pyrrolidone and 1,6-hexanediol.

11. The ink-jet ink of claim 1 further comprising at least one component independently selected from the group consisting of buffers, biocides, and metal chelators.

12. An ink-jet ink for printing on porous, non-porous, and hybrid glossy print media, said ink-jet ink comprising (a) 0.5 to 5 wt % of at least one water-soluble dye selected from the group consisting of yellow, cyan, and magenta dyes and (b) a vehicle comprising 5 to 20 wt % of at least one water-miscible organic co-solvent, about 0.1 to 5 wt % of a surfactant mixture comprising an anionic surfactant, a non-ionic surfactant, and an anionic fluoro-surfactant selected from the group consisting of $(R_FCH_2CH_2O)_xPO(O^-NH_4^+)_y$, where $R_F$ is $F(CF_2CF_2)_z$, where $z=1-7$ and where $x+y=3$; $(R_FCH_2CH_2O)_xPO(O^-NH_4^+)_y$, where $R_F$ is $F(CF_2CF_2)_z$, where $z=1-7$ and where $x+y=3+$hydrocarbon surfactant; $R_FCH_2CH_2SO_3H$, where $R_F$ is $F(CF_2CF_2)_z$, where $z=1-9$; $R_FCH_2CH_2SO_3^-NH_4^+$, where $R_F$ is $F(CF_2CF_2)_z$, where $z=1-9$; $C_6F_{13}CH_2CH_2SO_3H$; $C_6F_{13}CH_2CH_2SO_3^-NH_4^+$; $R_FCH_2CH_2S$—$CH_2CH_2COO^-Li^+$, where $R_F$ is $F(CF_2CF_2)_z$, where $z=1-9$; $R_FCH_2CH_2O(CH_2CH_2O)_xH$, where $R_F$ is $F(CF_2CF_2)_z$, where $z=1-7$; $R_FCH_2CH_2O(CH_2CH_2O)_yH$, where $R_F$ is $F(CF_2CF_2)_z$, where $z=1-9$; ammonium perfluoroalkyl sulfonates; potassium fluorinated alkyl carboxylates; fluorinated alkyl polyoxyethylene ethanols; fluorinated alkyl alkoxylate; and fluorinated alkyl ethers; 0 to about 1.5 wt % of at least one component independently selected from the group consisting of buffers, biocides, and metal chelators; and the balance water.

13. The ink-jet ink of claim 12 wherein said first surfactant is a diphenyl sulfonate derivative, a sulfonate, or a dioctyl sodium sulfosuccinate, said second surfactant is an acetylenic ethoxylated diol or a polyethylene oxide ether or a polypropylene oxide ether, and said third surfactant is said fluoro-surfactant.

14. The ink-jet ink of claim 12 wherein said yellow dye consists essentially of Direct Yellow 132, wherein said cyan dye consists essentially of Direct Blue 199, and wherein said magenta dye comprises a mixture consisting essentially of Magenta 377 and Acid Red 52.

15. The ink-jet ink of claim 12 wherein said at least one water-miscible cosolvent is selected from the group consisting of nitrogen-containing ketones; diols selected from the group consisting of ethanediols, propanediols, butanediols, pentanediols, hexanediols, heptanediols, and octanediols; $C_3$–$C_6$ alcohols and isomers thereof; glycol ethers selected from the group consisting of polyalkylene glycols, and polymeric glycols; thioglycol ethers; glycol ureas; and polyalkoxylated triols.

16. The ink-jet ink of claim 15 wherein said at least one water-miscible organic co-solvent is selected from the group consisting of 2-pyrrolidone, N-methyl-pyrrolid-2-one (NMP), 1,3-dimethylimidazolid-2-one, octyl-pyrrolidone, 1,2-ethanediol, 1,2-propanediol, 1,3-propanediol, 2-ethyl-2-hydroxymethyl- 1,3-propanediol, ethylhydroxypropanediol, 1,2-butanediol, 1,3-butanediol, 1,4-butanediol, 1,2-pentanediol, 1,5-pentanediol, 1,2-hexanediol, 1,6-hexanediol, 2,5-hexanediol, 1,2-heptanediol, 1,7-heptanediol, 1,2-octanediol, 1,8-octanediol, propanol, butanol, pentanol, and hexanol, diethylene glycol, triethylene glycol, tetraethylene glycol, dipropylene glycol, tripropylene glycol, tetrapropylene glycol, Polyethylene Glycol 200, Polyethylene Glycol 300, Polyethylene Glycol 400, Polypropylene Glycol 400, and thiodiglycol.

17. The ink-jet ink of claim 16 wherein said at least one water-miscible organic co-solvent comprises a mixture of 2-pyrrolidone and 1,6-hexanediol.

18. A method of printing an ink-jet ink on porous, non-porous, and hybrid glossy print media, said method comprising:

(a) providing an ink-jet ink composition, said ink-jet ink comprising at least one colorant and a vehicle comprising at least one water-miscible organic co-solvent and water, said ink-jet ink further comprising at least three surfactants, the total surfactant concentration ranging from about 0.1 to 5 wt %, a first surfactant consisting essentially of an anionic surfactant, a second surfactant consisting essentiaily of a non-ionic surfactant, and a third surfactant consisting essentially of a fluoro-surfactant, wherein said fluoro-surfactant is selected from the group consisting of $(R_FCH_2CH_2O)_xPO(O^-NH_4^+)_y$, where $R_F$ is $F(CF_2CF_2)_z$, where $z=1-7$ and where $x+y=3$; $(R_FCH_2CH_2O)_xPO(O^-NH_4^+)_y$, where $R_F$ is $F(CF_2CF_2)_z$, where $z=1-7$ and where $x+y=3+$hydrocarbon surfactant; $R_FCH_2CH_2SO_3H$, where $R_F$ is $F(CF_2CF_2)_z$, where $z=1-9$; $R_FCH_2CH_2SO_3^-NH_4^+$, where $R_F$ is $F(CF_2CF_2)_z$, where $z=1-9$; $C_6F_{13}CH_2CH_2SO_3H$; $C_6F_{13}CH_2CH_2SO_3^-NH_4^+$; $R_FCH_2CH_2S$—$CH_2CH_2COO^-Li^+$, where $R_F$ is $F(CF_2CF_2)_z$, where $z=1-9$; $R_FCH_2CH_2O(CH_2CH_2O)_xH$, where $R_F$ is $F(CF_2CF_2)_z$, where $z=1-7$; $R_FCH_2CH_2O(CH_2CH_2O)_yH$, where $R_F$ is $F(CF_2CF_2)_z$, where $z=1-9$; ammonium perfluoroalkyl sulfonates; potassium fluorinated alkyl carboxylates; fluorinated alkyl polyoxyethylene ethanols; fluorinated alkyl alkoxylate; and fluorinated alkyl ethers; and (b) causing droplets of said ink-jet ink composition to be jetted through an orifice plate onto said print media.

19. The method of claim 18 wherein said non-ionic surfactant has a concentration within a range of about 0.05 to 3 wt % of said ink and wherein said fluoro-surfactant has a concentration within a range of about 0.001 to 3 wt % of said ink.

20. The method of claim 18 wherein said first surfactant has a concentration within a range of about 0.05 to 3 wt % of said ink.

21. The method of claim 18 wherein said first surfactant is a diphenyl sulfonate derivative, a sulfonate, or a dioctyl sodium sulfosuccinate, said second surfactant is an acetylenic ethoxylated diol or a polyethylene oxide ether or polypropylene oxide ether, and said third surfactant is said fluoro-surfactant.

* * * * *

UNITED STATES PATENT AND TRADEMARK OFFICE
CERTIFICATE OF CORRECTION

PATENT NO. : 6,436,180 B1  Page 1 of 1
DATED : August 20, 2002
INVENTOR(S) : Ma et al.

It is certified that error appears in the above-identified patent and that said Letters Patent is hereby corrected as shown below:

Column 10,
Line 52, after "tetrapropylene", delete "92".

Signed and Sealed this

Twentieth Day of January, 2004

JON W. DUDAS
*Acting Director of the United States Patent and Trademark Office*